United States Patent [19]

Colford

[11] Patent Number: 5,695,176
[45] Date of Patent: Dec. 9, 1997

[54] TORSIONAL VIBRATION DAMPER

[75] Inventor: Terry Colford, Leicestershire, England

[73] Assignee: Firma Carl Freudenberg, Weinheim, Germany

[21] Appl. No.: 560,057

[22] Filed: Nov. 17, 1995

[30] Foreign Application Priority Data

Nov. 17, 1994 [GB] United Kingdom ............ 44 40 885.4

[51] Int. Cl.$^6$ ........................................................ F16F 1/06
[52] U.S. Cl. ........................ 267/155; 74/574; 267/154; 267/251
[58] Field of Search ........................ 267/155, 141.3, 267/292, 154, 279, 281; 188/378, 379, 380; 464/180, 77; 74/574

[56] References Cited

U.S. PATENT DOCUMENTS

| | | | |
|---|---|---|---|
| 3,654,777 | 4/1972 | Grundman | 64/30 |
| 5,234,377 | 8/1993 | Stretch et al. | 464/77 |
| 5,377,962 | 1/1995 | Ochs et al. | 267/141.3 X |
| 5,445,049 | 8/1995 | Ullrich et al. | 267/141.3 X |
| 5,452,622 | 9/1995 | Fenelon | 74/411 |
| 5,460,356 | 10/1995 | Schwibinger | 267/281 |

FOREIGN PATENT DOCUMENTS 76 04 193  10/1977  Germany.

*Primary Examiner*—Robert J. Oberleitner
*Assistant Examiner*—Pamela J. Lipka
*Attorney, Agent, or Firm*—Kenyon & Kenyon

[57] ABSTRACT

A torsional vibration damper with an essentially cup-shaped hub ring made of metallic material, an annular casing and a rotating ring. The hub ring and annular casing and the rotating ring are spaced from one another by a radial clearance and are joined in a torsionally flexible manner by a spring element made of elastomeric material. The spring element is arranged in the opening formed by the clearance. The casing of the hub ring is provided at least radially externally with an adhering first coating made of thermosetting plastic, which coating may have a pulley-type of surface profiling. The first coating may be reinforced with fibers for dimensional stability, and the second coating may expand and contract with temperature variations to ensure constant prestressing in the spring element.

12 Claims, 2 Drawing Sheets

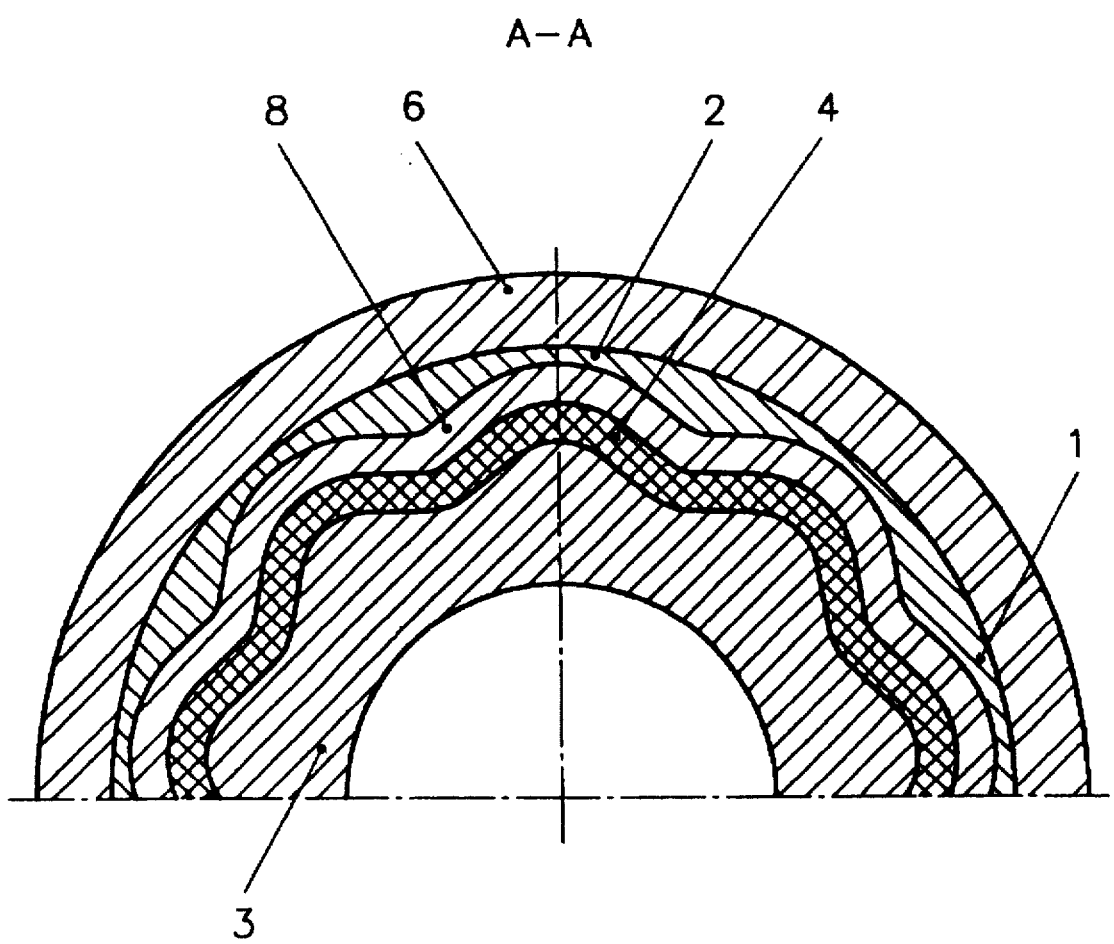

TORSIONAL VIBRATION DAMPER

BACKGROUND OF THE INVENTION

1. Field of the Invention

The present invention relates to a torsional vibration damper including an essentially cup-shaped hub ring made of metallic material, an annular casing and a rotating ring. Each of these elements are contiguously oriented relative to one another with radial clearance, and are joined in a torsionally flexible manner by a spring element made of elastomeric material. The spring element is arranged in an opening formed by the clearance.

2. Discussion of the Prior Art

A torsional vibration damper is shown in German Publication DE-GM 76 04 193. The torsional vibration damper in that publication is constructed as a two-mass damper, with two rotating rings being provided which are each joined via a spring element to the hub ring. The two rotating rings are arranged, respectively, radially inside and radially outside on the casing of the cup-shaped hub ring, and the rotating rings and the hub ring are essentially in the same radial plane. The rotating rings are axially fixed relative to the hub ring by the casing, in the area of the surfaces extending in the axial direction. The rotating rings, on their sides facing the casing and the spring elements, have an essentially V-shaped curvature in the same direction.

SUMMARY OF THE INVENTION

The object of the present invention is to provide a torsional vibration damper that has an integrated pulley and, because of its simple design, may be manufactured easily, from the production engineering standpoint, and cost-effectively, from the economic standpoint.

In the present invention, the casing of the hub ring is provided, at least on its radially outer surface, with an adhering first coating made of thermosetting plastic, and the first coating has pulley-type surface profiling. This feature is advantageous because the first coating is integrally molded directly on the casing of the hub ring and no machine working of a metallic structural element and/or complicated reshaping processes are needed to produce the pulley-type surface profiling. Because of the use of thermosetting plastic for its manufacture, a coating is provided which is creep-resistant and therefore also dimensionally stable when used in different temperature ranges. For example, if the torsional vibration damper is used for driving ancillary components of a combustion engine, uniformly good working properties are ensured even in long-term use regardless of the temperatures occurring during normal operation.

To ensure simple fabrication, preferably the hub ring is a deep-drawn part. By applying the adhering coating made of thermosetting plastic subsequent to the manufacture of the hub ring, the present invention may be manufactured extremely easily and cost-effectively. The hub ring includes the annular casing extending in the axial direction, of which one end surface has a radial flange having at least one fixing device. The radial flange and the fixing devices can be constructed in such a way that the torsional vibration damper may be joined to the crankshaft of a combustion engine.

According to one advantageous refinement and with a view to better consistency in the damping action during changing ambient temperatures, it has proven advantageous to use a directly integrally-molded second coating consisting of thermosetting plastic arranged on the side of the hub ring casing facing away from the first coating. It has also proven advantageous that the first and the second coating be configured integrally and continuously with one another. The second coating surrounds the rotating ring, preferably externally and with radial clearance, while the spring element, under radial prestressing, contacts the second coating and the rotating ring. The contacting of the second coating and the spring element under radial prestressing has the advantage that the prestressing in the spring element does not undergo any significant change even with rising temperatures. The loss in spring stiffness of the spring element resulting from temperature changes is counteracted by an increasing prestressing of the spring element. The greater prestressing is produced because the second coating expands slightly in the radial direction as a result of rising temperature. The expansion, in quantitative respect, is equal to the decrease in spring stiffness of the spring element in dependence upon the particular temperatures reached. Because of this, the resulting damping action is constant, largely independent of the temperature. The ratio of the average radial thickness of the second coating and the radial thickness of the spring element is preferably 0.25 to 3.

The rotating ring is made preferably of a metallic material. Even rotating rings having relatively small dimensions can have comparatively large inertial masses which, with a view to good torsional vibration damping, is advantageous.

The first and/or the second coating can be made of epoxy resin or polyester resin. In the use of epoxy or polyester resins, it is advantageous that the hub ring, made preferably of a deep-drawn sheet metal part, experiences a noticeable improvement in its rigidity in the region of its casing because of the fast-adhering coating of thermosetting plastic. The sheet steel, of which, for example, the hub ring can be made, has a comparatively small thickness and, because of this, has a comparatively small weight. The reduction in the total weight of the hub ring resulting from this thickness allows the mass of the rotating ring to be increased to an equal extent, and further improved damping action is achieved, relative to the total weight of the torsional vibration damper.

To reduce wear and tear and to provide uniformly good working properties of the torsional vibration damper during its entire service life, at least the plastic forming the first coating can be reinforced by fibers distributed within the plastic. Preferably only the first coating is reinforced by fibers, the fibers being made of textiles, mineral or metallic materials. If the fibers are of short length, it is possible to intermix them directly with the plastic, which simplifies the attainment of a uniform distribution of fibers. On the other hand, if the fibers are of greater length, the fibers may be joined to one another to form an inherently stable fabric. For example, the fabric may have the construction of a woven fabric, a knitted fabric or a formed fabric. Advisably, the fabric should extend in the circumferential direction. If only the first coating which forms the pulley is reinforced by fibers or a fabric made of fibers, the deformations over the entire temperature range are negligibly small, resulting in no disadvantageous working properties with regard to unwanted changes in the speed ratio of the belt drive. It is advantageous that the second coating not be reinforced with fibers, because of the thermal expansion and the increase in prestressing on the spring element resulting from the second coating, which offsets the changes in spring stiffness.

The surfaces of the rotating ring and the second coating facing each other in the axial direction can be formed congruently and with a bell-curve shape. A relatively enlarged surface is achieved by the bell-curve shape, resulting in an increase in the transferable force. Such a geometry produces improved support of the thrust ring relative to the second coating in the axial direction.

The casing, the second coating, the spring element and the surface of the rotating ring facing the spring element can each have a coinciding sinusoidal wave shape in the circumferential direction. Besides an increase in the adhesive surface used to reliably fix the coating, a marked increase in the dimensional stability of the hub ring results from this configuration. The thickness of the starting material needed for the production of the hub ring can be further reduced in this manner.

To simplify the manufacture of the torsional vibration damper, the casing can be provided with recesses which, for example, can be produced by punching or boring. After penetration of the integrally-molded coating in the liquid state into the recesses, a form-locking claw-like catching of the two coatings with the casing results. If altogether two coatings are used radially inside and radially outside the casing, a particularly good dimensional stability of the hub ring results because of this sandwich structure.

BRIEF DESCRIPTION OF THE DRAWING

The subject matter of the present invention is explained with the aid of the attached drawings. FIG. 2 shows the embodiment of FIG. 1 in radial cross-section, along line A—A of FIG. 1.

DETAILED DESCRIPTION OF THE INVENTION

Figure 1:
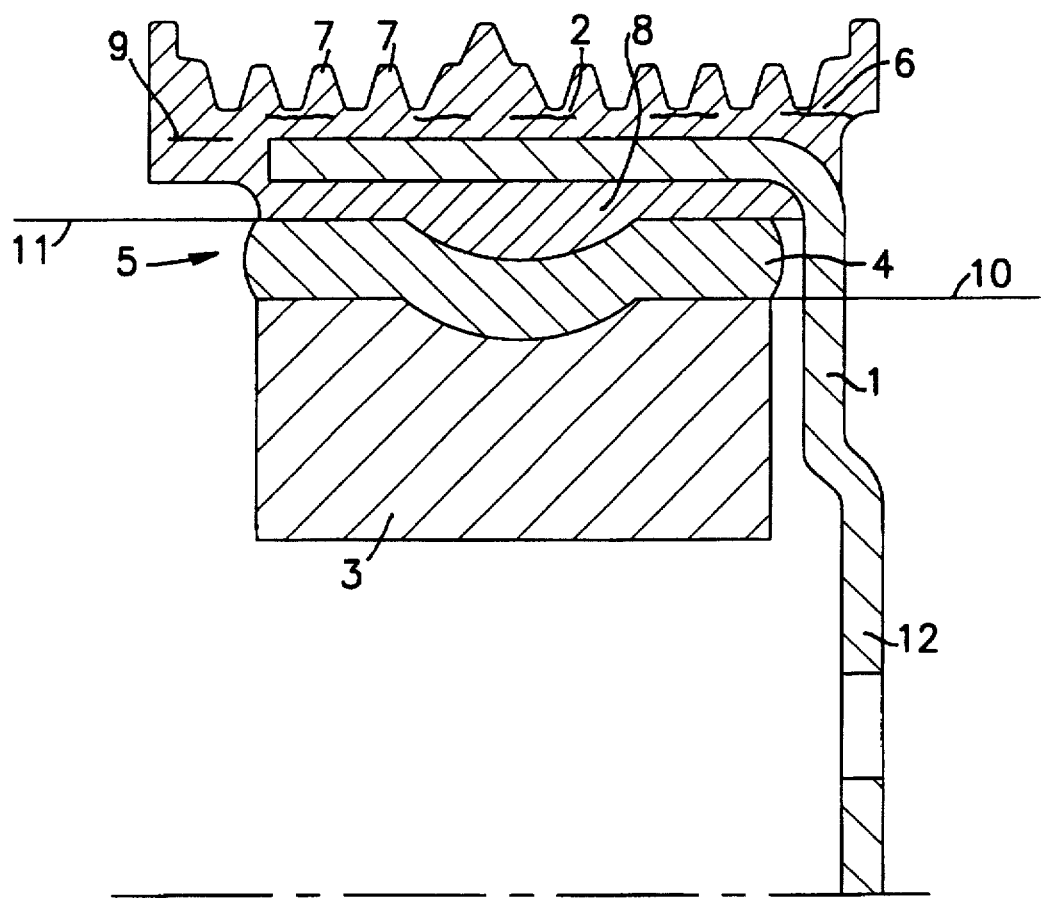
FIG. 1 shows an exemplary embodiment of the torsional vibration damper according to the invention, represented in longitudinal cross-section.

In the drawing, a torsional vibration damper is shown that is provided with an integrated pulley which is an integral component of the hub ring 1. The hub ring 1 is a deep-drawn part made of metallic material and, viewed in cross-section, is formed essentially in a cup shape. The casing 2 changes in the axial direction on one side into the radial flange 12 of the hub ring 1. The radial flange 12 may be flange-mounted to a crankshaft of a combustion engine (not shown). The casing 2 has first and second coatings 6, 8 radially outside and radially inside which both are made of a thermosetting plastic and are integrally molded directly on the casing 2. The first coating 6 is radially external and has a pulley-type surface profiling 7. A belt placed on the torsional vibration damper can be provided, for example, to drive ancillary components of a combustion engine. The first coating 6 and the second coating 8 are uniform in material and are made integrally and continuously with one another. The end surface of the casing 2 facing away from the radial flange 12 is enclosed by the thermosetting plastic of the two coatings 6, 8. The hub ring 1 is designed as a pulley. The casing 2 with the directly integrally-molded coatings 6, 8 concentrically surrounds the rotating ring 3 radially on the outer peripheral side, and the spring element 4 is fitted in-between. The second coating 8 has a pre-curvature directed radially inwardly, which is designed essentially with a bell curve shape. A circumferential depression that is shaped congruently on the peripheral side of the surface 10 of the rotating ring 3 is provided corresponding to the surface 11 of the second coating 8 facing the casing 2.

In the exemplary embodiment shown in the drawing, only the plastic forming the first coating 6 may be reinforced by fibers 9 distributed therein. The fibers 9 may be joined to one another to form an inherently stable fabric. The second coating 8 is not fiber-reinforced. It is advantageous that on the one side, the first coating 6 remains dimensionally stable regardless of the temperatures occurring during the operation of the torsional vibration damper. Changes in the geometry of the first coating 6 are prevented, which is important in light of the need for an unvarying pulley ratio and uniformly good working properties during operation. To keep the prestressing in the spring element 4 largely constant without significant changes even with rising temperatures, the second coating 8 is designed without fiber-reinforcement, so that the loss in spring stiffness of the spring element 4 resulting from temperature changes is offset by increasing prestressing. The increased prestressing results from a radial expansion of the second coating 8 during rising temperatures. Because of this, the damping properties of the torsional vibration damper are largely temperature-independent and constant through a large temperature range.

I claim:

1. A torsional vibration damper comprising:
   an essentially cup-shaped hub ring;
   an annular casing, said annular casing comprising a radially external first coating made of a thermosetting plastic material, said first coating being directly molded on said hub ring, said first coating comprising a surface profile;
   a rotating ring, said annular casing and said rotating ring being spaced from one another by a radial clearance; and
   a spring element made of elastomeric material, said spring element joining said annular casing and said rotating ring in a torsionally flexible manner, said spring element being located in said radial clearance.

2. The torsional vibration damper of claim 1, wherein:
   said hub ring is deep-drawn.

3. The torsional vibration damper of claim 1, wherein said rotating ring is made of a metallic material.

4. The torsional vibration damper of claim 1, wherein:
   the thermoplastic material forming said first coating is reinforced by fibers distributed in the thermoplastic material.

5. The torsional vibration damper of claim 4, wherein:
   said fibers are joined to one another to form a stable fabric.

6. The torsional vibration damper of claim 1, wherein:
   said hub ring is made of a metallic material.

7. A torsional vibration damper comprising:
   an essentially cup-shaped hub ring;
   an annular casing, said annular casing comprising a radially external first coating made of a thermosetting plastic material, said first coating comprising a surface profile;
   a rotating ring, said annular casing and said rotating ring being spaced from one another by a radial clearance;
   a spring element made of elastomeric material, said spring element joining said annular casing and said rotating ring in a torsionally flexible manner, said spring element being located in said radial clearance; and
   a second coating made of a thermosetting plastic material located on a side of said hub ring facing away from said first coating, said first and second coatings being molded integrally and continuously with one another.

8. The torsional vibration damper of claim 7, wherein:
   said first and second coatings are made of epoxy resin or polyester resin.

9. The torsional vibration damper of claim 7, wherein:
   a ratio of the average radial thickness of said second coating to the radial thickness of said spring element is between 0.25 to 3.

10. A torsional vibration damper comprising:

an essentially cup-shaped hub ring;

an annular casing, said annular casing comprising a radially external first coating made of a thermosetting plastic material, said first coating comprising a surface profile, said annular casing further comprising a second coating;

a rotating ring, said annular casing and said rotating ring being spaced from one another by a radial clearance; and a spring element made of elastomeric material, said spring element joining said annular casing and said rotating ring in a torsionally flexible manner, said spring element being located in said radial clearance, wherein said second coating surrounds said rotating ring and is spaced from said rotating ring by said radial clearance, and wherein said spring element contacts said second coating and said rotating ring under radial prestressing.

11. A torsional vibration damper comprising:

an essentially cup-shaped hub ring;

an annular casing, said annular casing comprising a radially external first coating made of a thermosetting plastic material, said first coating comprising a surface profile, said annular casing further comprising a second coating;

a rotating ring, said annular casing and said rotating ring being spaced from one another by a radial clearance; and a spring element made of elastomeric material, said spring element joining said annular casing and said rotating ring in a torsionally flexible manner, said spring element being located in said radial clearance, wherein surfaces of said rotating ring and said second coating facing one another are formed with coinciding bell-curve shapes.

12. A torsional vibration damper comprising:

an essentially cup-shaped hub ring;

an annular casing, said annular casing comprising a radially external first coating made of a thermosetting plastic material, said first coating comprising a surface profile, said annular casing further comprising a second coating;

a rotating ring, said annular casing and said rotating ring being spaced from one another by a radial clearance; and a spring element made of elastomeric material, said spring element joining said annular casing and said rotating ring in a torsionally flexible manner, said spring element being located in said radial clearance, wherein said casing, said second coating, said spring element and a surface of said rotating ring facing said spring element each have coinciding sinusoidal wave shapes in a circumferential direction.

* * * * *